United States Patent [19]

Katsuzawa et al.

[11] Patent Number: 5,229,673
[45] Date of Patent: Jul. 20, 1993

[54] JOINT CONSTRUCTION OF COOLING PIPES FOR LIQUID COOLED MOTOR

[75] Inventors: Yukio Katsuzawa; Michi Masuya, both of Yamanashi, Japan

[73] Assignee: Fanuc Ltd., Yamanashi, Japan

[21] Appl. No.: 830,514

[22] Filed: Feb. 3, 1992

Related U.S. Application Data

[63] Continuation of Ser. No. 415,212, Sep. 13, 1989, abandoned.

[30] Foreign Application Priority Data

Feb. 2, 1988 [JP] Japan .................. 63-21169

[51] Int. Cl.5 .................. H02K 5/20; F16L 55/027
[52] U.S. Cl. .................. 310/64; 310/54; 310/58; 285/178; 285/176
[58] Field of Search .................. 310/64, 58, 89, 59, 310/54, 52; 277/201, 205, 206 R, 206 A, 178, 207 A, 217; 92/177; 165/9; 285/176, 177, 211, 368, 412, 178

[56] References Cited

U.S. PATENT DOCUMENTS 1,834,581 12/1931 Ferrell et al. .................. 285/368
2,826,436 3/1958 Hupp et al. .................. 285/211
3,031,200 4/1962 Hamer .................. 277/201
4,185,857 1/1980 Saracco .................. 285/910 X
4,691,131 9/1987 Nakano .................. 310/54
4,745,314 5/1988 Nakano .................. 310/57

FOREIGN PATENT DOCUMENTS 539819 12/1931 Fed. Rep. of Germany ...... 285/178
60-121941 6/1985 Japan .

Primary Examiner—R. Skudy
Assistant Examiner—Ed To
Attorney, Agent, or Firm—Nikaido, Marmelstein, Murray & Oram

[57] ABSTRACT

A liquid cooled motor in which cooling pipelines are located in a casing around an outer periphery of a stator core, comprising deformed O-rings (5) provided around the circumferential edges of a deformed cross sectional hole (40) at ends of a casing (1), and circular cross sectional holes (41) of a housing (2, 3) which are connected to parts of the deformed cross sectional hole (40) to connect the casing (1) and the housing (2, 3). The invention is applied to a general small liquid cooled motor which needs high output and high revolution speed.

2 Claims, 4 Drawing Sheets

Fig.I(A)
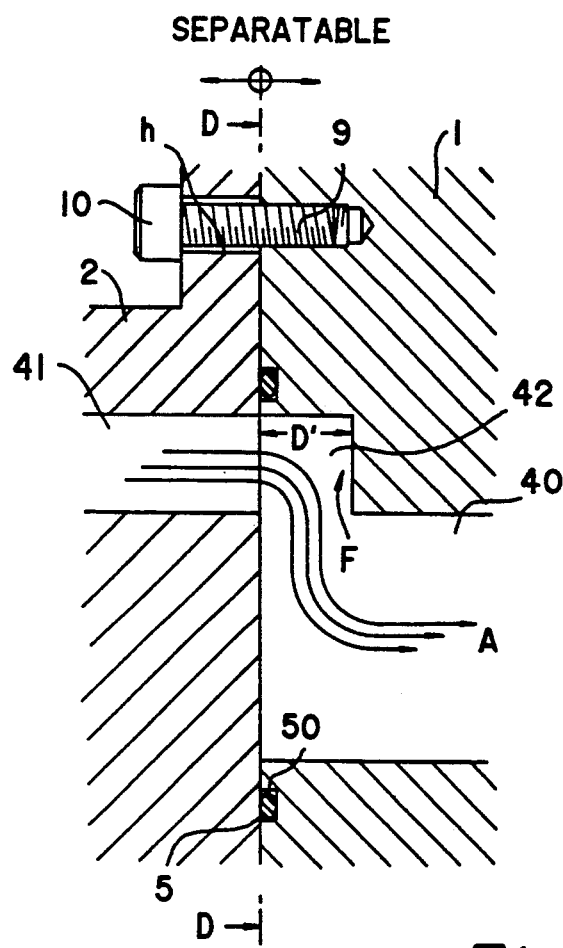
Fig.I(B)
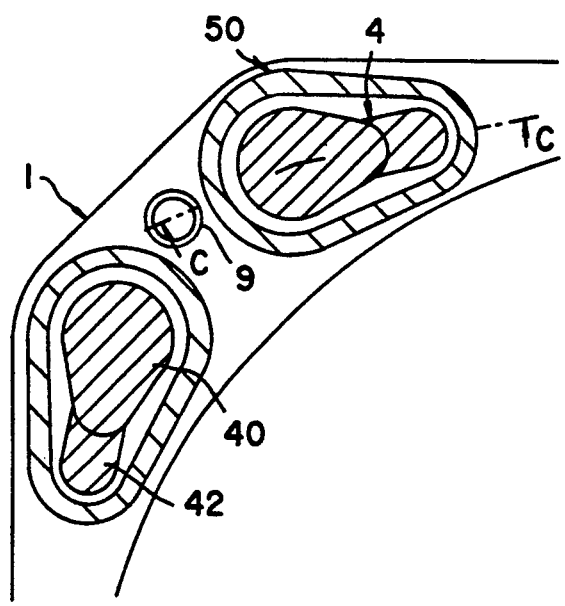
Fig.I(C)
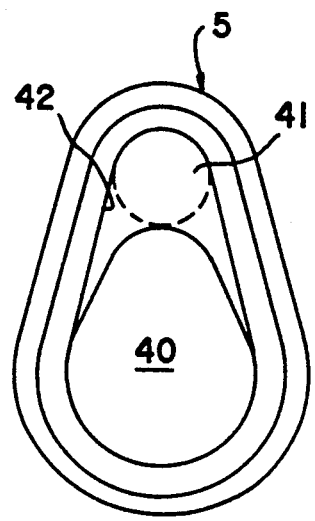

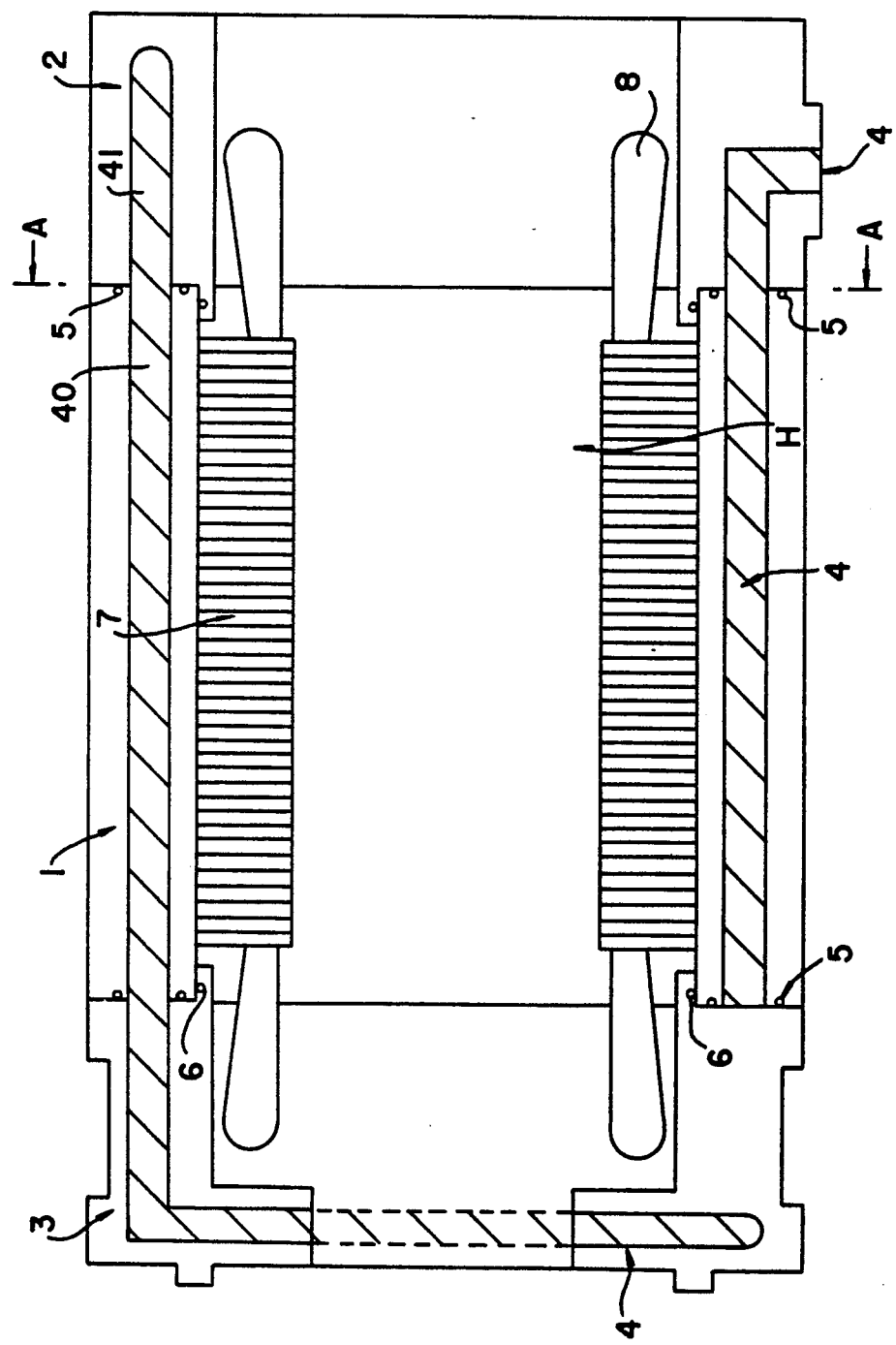

Fig.4(A)
PRIOR ART
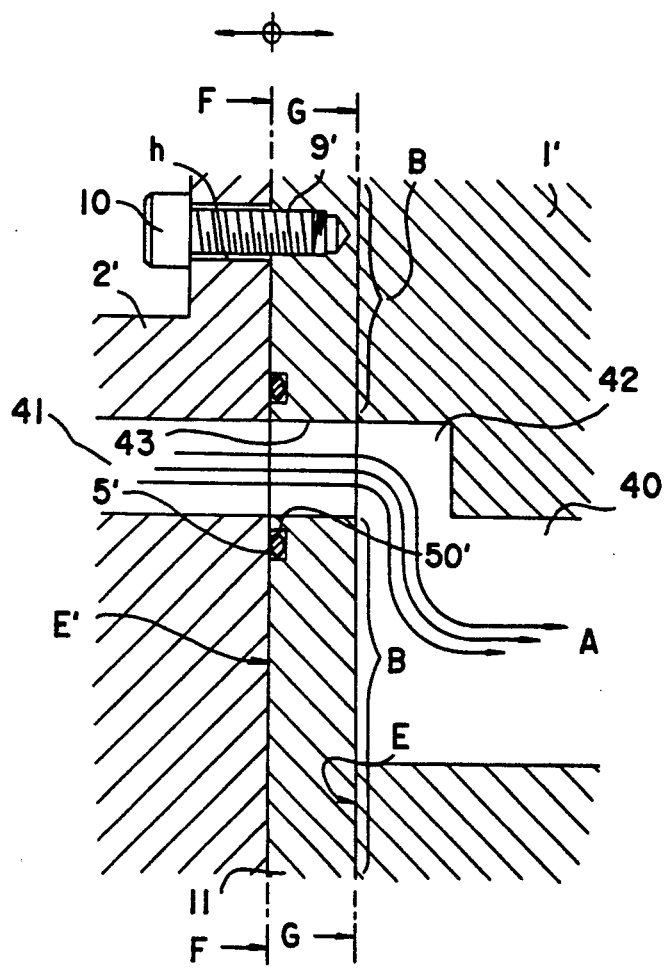
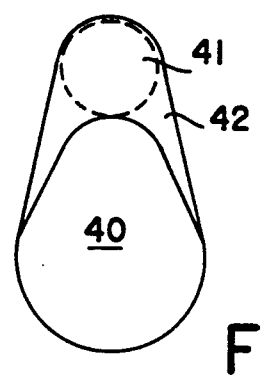
Fig.4(B)
PRIOR ART
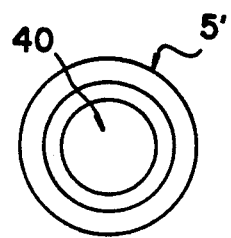
Fig.4(C)
PRIOR ART

JOINT CONSTRUCTION OF COOLING PIPES FOR LIQUID COOLED MOTOR

This application is a continuation of application Ser. No. 415,212 filed Sep. 13, 1989, now abandoned.

DESCRIPTION

1. Technical Field

The present invention relates to a joint construction of cooling pipes for a liquid cooled motor and is generally applied to a small liquid cooled motor which needs a high output and a large number of revolutions and which has pipes provided on a portion of a casing outside a stator core.

2. Background Art

Since a liquid cooled motor has a high cooling efficiency and produces an output 1.5-2 times that of an air cooled motor having the same size, a conventional circulation system of a coolant has a surface area portion (deformed cross sectional hole having an increased circumferential surface area) provided on the portion of the casing outside the stator core to increase the cooling efficiency, so that pipes provided in a housing (front flange and rear bracket) which supports bearings at the opposite ends of the casing are connected to the deformed cross sectional hole to connect the casing and the housing. However, it is necessary to strictly seal the connecting portions to prevent leakage of the coolant thereby to increase the reliability of sealing against the leakage.

FIGS. 4(A), (B) and (C) show a conventional joint construction of cooling pipes. The casing 1' has a deformed cross sectional hole 40 to increase the cooling efficiency. The deformed cross sectional hole 40 has at its end a connecting port 42 laterally extending therefrom. The connecting end face E of the casing 1' is coated with an adhesive B having an oil sealing effect, so that a cover plate 11 having an circular sectional hole 43 is adhered thereto so as to make the hole 43 coincident with the connecting port 42. After that, an O-ring 5' is fitted in a groove 50' provided on the outer periphery of a hole 41 formed at a free end face E' of the cover plate 11, so that the circular cross sectional hole 43 of the housing (rear bracket) 2' coincides with the circular cross sectional hole 43 of the cover plate 11. After that, a bolt 10 is screwed into a threaded hole 9' of the cover plate 11 through a hole h of the bracket 2' to defined a circulation pipe line in which the pipes 40, 42, 43 and 41 are connected. The coolant oil flows as shown by arrows A.

In the improved prior art mentioned above, although an O-ring 5' having an excellent oil seal effect is used, since the standard O-ring is applied in the form of a circle, both the connecting holes at the portion to which the O-ring is applied, i.e., at the connecting portion E' of the deformed cross sectional hole 40 and the circular cross sectional hole 41 must be of a circular cross section, resulting in usage of a cover plate 11 having connecting hole 43 having a circular cross section. Furthermore, it is necessary to provide the adhesive B on the end face of the casing 1' to connect the cover plate 11 thereto.

To realize a perfect oil sealing effect, the cover plate 11 is connected to the casing 1' by vacuum resin impregnation means. However, the application of the cover plate 11 is troublesome and costly.

The present invention solves the drawbacks mentioned above by providing a simple connecting construction of the deformed cross sectional hole of the casing and the circular cross sectional hole of the housing.

DISCLOSURE OF INVENTION

As shown in FIGS. 1(A), (B) and (C), the deformed cross sectional hole 40 is formed in the casing 1, so that the deformed cross sectional hole 40 has at its end an connecting port 42 laterally extending therefrom. Around the connecting end port is provided a groove 50 in which a deformed O-ring 5 is fitted. The housing 2 is integrally connected to the casing 1, so that the circular cross sectional hole 41 of the housing 2 is coincident with the connecting port 42, by a bolt 10. Thus, the deformed cross sectional hole 40 of the casing 1 and the circular cross sectional hole of the housing 2 are connected to each other.

Since the casing 1 and the housing 2 are directly connected by the bolt 10, the conventional cover plate can be dispensed with. The usage of the deformed O-ring increases the freedom in shape of the pipes of the casing portion for cooling the stator, thus resulting in a realization of a casing of appropriate size.

The deformed O-ring makes it possible to perform a perfect seal with a single kind of seal member, resulting in simplification of the operation and steps of manufacturing.

Since the conventional cover plate (11 in FIG. 4(A)) can be omitted, a compact liquid cooled motor can be realized.

Since an optional shape of the groove can be machined by a small diameter end mill ($\phi 2 - \phi 5$) of a numerical control machine tool, the freedom in designing the cross sectional shape of the stator cooling pipes of the casing is increased, so that the casing can be of optimum size.

BRIEF DESCRIPTION OF THE DRAWINGS

Each of FIGS. 1 show enlarged views of a main part of an embodiment of the present invention, of which FIG. 1(A) is an enlarged sectional view of a connecting portion of the casing and the housing, taken along the line C—C in FIG. 1(B), 1(B) is an enlarged view of the portion B in FIG. 3, and FIG. 1(C) is a sectional view taken along the line D—D in FIG. 1(A).

FIG. 2 is a schematic longitudinal sectional view of an embodiment of the present invention.

FIG. 4 are explanatory views of the prior art, of which FIG. 4(A) is an enlarged sectional view of a connecting portion of a casing and a housing, FIG. 4(B) is a sectional view taken along the line G—G in FIG. 4(A), and FIG. 4(C) is a sectional view taken along the line F—F in FIG. 4(A).

BEST MODE FOR CARRYING OUT THE INVENTION

Figure 3:
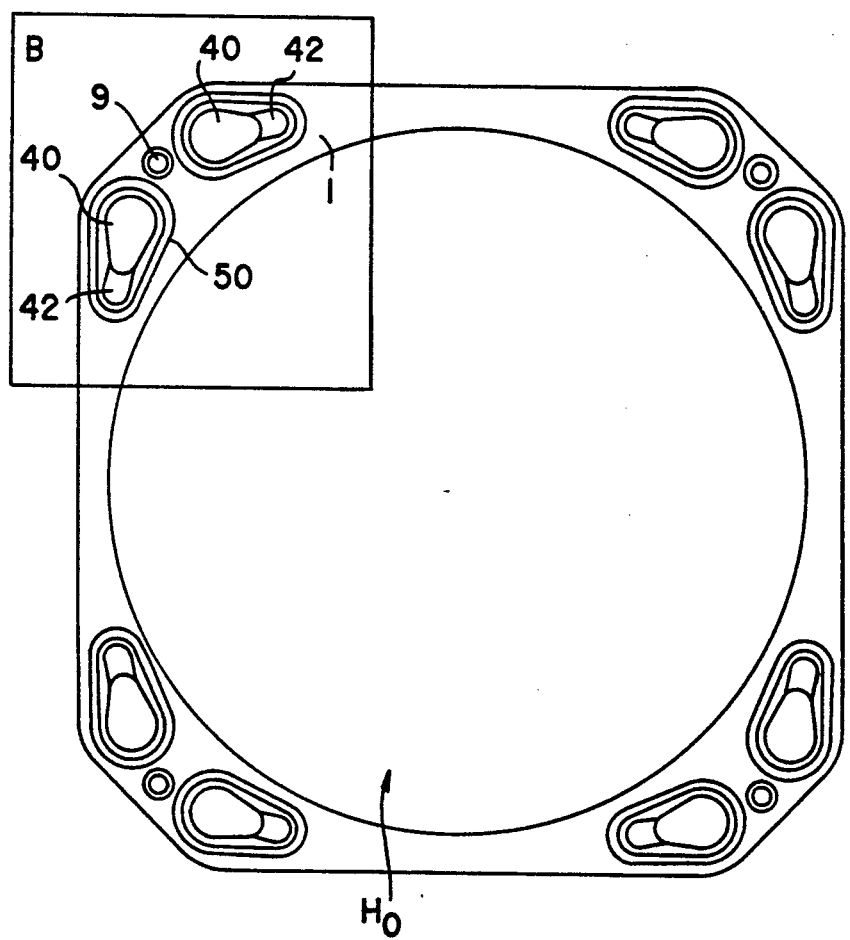
FIG. 3 is a sectional view taken along the line A—A in FIG. 2.

The present invention was applied to a liquid cooled type induction motor for driving a spindle of a machine tool. As shown in FIG. 2, a front flange 3 and a rear bracket 2 are secured to the opposite ends of the casing 1 which surrounds the stator core 7 having a rotor insertion hole H, so that a passage 4 for circulating the coolant oil is formed throughout the casing and the housing (the front flange 3 and the rear bracket).

As can be seen from FIG. 3, the casing 1 which is die-cast of aluminum alloy is substantially angular cylindrical, having a hole $H_0$ for enclosing the stator core 7 (shown in FIG. 2) and is provided on each of its four corners with a pair of deformed cross sectional holes 40 extending therethrough. As shown in FIGS. 1(A), (B) and (C), the connecting ports 42 having a depth of D' are formed at the ends of the deformed cross sectional holes 40 by an end mill. The grooves 50 which are analogous to the openings of the ends of the deformed cross sectional holes 40 which are formed around the openings by a two-axis synchronous numerical control machine tool.

The front flange 3 and the rear bracket 2 as the housing are same as those of the prior art having the circular cross sectional holes 41.

Upon assembly, after the deformed O-rings (NBR) 5 (i.e., non-circular O-ring, see FIG. 1(C)) of oilproof rubber are fitted in the grooves 50, the front flange 3 and the rear bracket 2 are brought into contact with each other, so that they are fixed to each other by the bolts 10 which are screwed in the threaded holes 9 of the casing through the holes h. Numeral 6 designates common O-rings which are used as auxiliary means, and numeral 8 designates a coil end. In the joint construction thus obtained, the coolant oil flows in the direction shown by the arrows A, similarly to the pipes (passage) of the prior art. The bottom surface F of the connecting ports 42 contributes to a smooth diffusion of the flow from the circular cross sectional holes 41 toward the deformed cross sectional holes 40. The deformed O-rings 5 ensures a perfect oil seal.

In the illustrated embodiment, since the conventional cover plate 11 shown in FIG. 4 can be dispensed with, no step for connecting the cover plate 11 to the end of the casing is necessary in the course of manufacturing, resulting in a remarkably simplified manufacturing process.

We claim:

1. A joint construction of cooling pipe lines in a liquid cooled motor comprising:
   a casing having ends formed with deformed cross sectional holes and non-circular grooves non-contiguous with the deformed cross sectional holes and said non-circular grooves surrounding the deformed cross sectional holes;
   non-circular O-rings provided inside said non-circular grooves;
   a housing having circular cross sectional holes; and
   connecting means for connecting said circular cross sectional holes to said deformed cross sectional holes.

2. A joint construction of cooling pipe lines in a liquid cooled motor according to claim 1, wherein said circular cross sectional holes are connected to connection ports which laterally extend from the deformed cross sectional hole.

* * * * *